(12) United States Patent
Ishi et al.

(10) Patent No.: US 11,207,741 B2
(45) Date of Patent: Dec. 28, 2021

(54) CUTTING INSERT, CUTTING TOOL AND METHOD FOR MANUFACTURING MACHINED PRODUCT

(71) Applicant: KYOCERA CORPORATION, Kyoto (JP)

(72) Inventors: Hirohisa Ishi, Moriyama (JP); Kazuki Yamamichi, Yasu (JP); Shohei Mao, Yasu (JP)

(73) Assignee: KYOCERA Corporation, Kyoto (JP)

( * ) Notice: Subject to any disclaimer, the term of this patent is extended or adjusted under 35 U.S.C. 154(b) by 13 days.

(21) Appl. No.: 16/633,591

(22) PCT Filed: Jul. 23, 2018

(86) PCT No.: PCT/JP2018/027525
§ 371 (c)(1),
(2) Date: Jan. 24, 2020

(87) PCT Pub. No.: WO2019/022016
PCT Pub. Date: Jan. 31, 2019

(65) Prior Publication Data
US 2020/0206831 A1  Jul. 2, 2020

(30) Foreign Application Priority Data

Jul. 26, 2017  (JP) ............................. JP2017-144513

(51) Int. Cl.
*B23C 5/10* (2006.01)
*B23C 5/20* (2006.01)

(52) U.S. Cl.
CPC . *B23C 5/20* (2013.01); *B23C 5/10* (2013.01)

(58) Field of Classification Search
CPC ..... B23C 2200/203; B23C 5/10; B23C 5/109; B23C 5/20; B23C 5/207; B23C 5/2213
See application file for complete search history.

(56) References Cited

U.S. PATENT DOCUMENTS

| | | | |
|---|---|---|---|
| 6,196,770 B1 | 3/2001 | Aström et al. | |
| 7,040,844 B1* | 5/2006 | Daiguji | B23C 5/109 407/113 |
| 7,261,497 B2* | 8/2007 | Maeda | B23C 5/109 407/113 |

(Continued)

FOREIGN PATENT DOCUMENTS

| | | |
|---|---|---|
| CN | 1299306 A | 6/2001 |
| CN | 102886551 A | 1/2013 |

(Continued)

*Primary Examiner* — Nicole N Ramos
(74) *Attorney, Agent, or Firm* — Viering Jentschura & Partner Mbb

(57) ABSTRACT

A cutting insert may include a first surface having a polygonal shape, a second surface, and a cutting edge located on a ridge line where the first surface intersects with the second surface. The first surface may include a first corner, a second corner, a third corner, a first side, and a second side. In a plan view of the first surface, the first side may have a straight line shape or a convex shape protruded outward relative to a first imaginary line connecting the first corner and the second corner, and the second side may have a concave shape recessed inward relative to a second imaginary line connecting the first corner and the third corner.

19 Claims, 12 Drawing Sheets

(56) References Cited

U.S. PATENT DOCUMENTS

| | | | | |
|---|---|---|---|---|
| 7,281,884 | B2* | 10/2007 | Maeda | B23C 5/109 |
| | | | | 407/113 |
| 7,402,005 | B2* | 7/2008 | Deitert | B23C 5/207 |
| | | | | 407/113 |
| 7,905,688 | B2* | 3/2011 | Ertl | B23C 5/2221 |
| | | | | 407/42 |
| 8,727,675 | B2* | 5/2014 | Nam | B23C 5/06 |
| | | | | 407/113 |
| 2004/0223818 | A1* | 11/2004 | Sheffler | B23C 5/207 |
| | | | | 407/48 |
| 2010/0080662 | A1* | 4/2010 | Satran | B23C 5/2213 |
| | | | | 407/40 |
| 2012/0009029 | A1 | 1/2012 | Saji | |
| 2013/0022423 | A1 | 1/2013 | Ramesh | |
| 2013/0315684 | A1 | 11/2013 | Ramesh | |
| 2017/0157685 | A1* | 6/2017 | Mao | B23C 5/109 |
| 2017/0197259 | A1* | 7/2017 | Kumoi | B23C 5/207 |
| 2017/0291231 | A1* | 10/2017 | Mao | B23C 5/109 |
| 2017/0326656 | A1* | 11/2017 | Saji | B23C 5/109 |

FOREIGN PATENT DOCUMENTS

| | | | |
|---|---|---|---|
| CN | 103447591 | A | 12/2013 |
| JP | H11333616 | A | 12/1999 |
| JP | 2007185769 | A | 7/2007 |
| WO | 2010114094 | A1 | 10/2010 |

* cited by examiner

FIG. 12
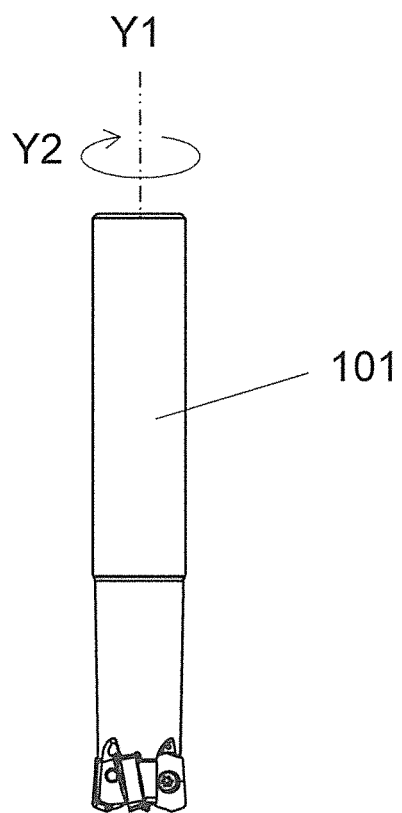
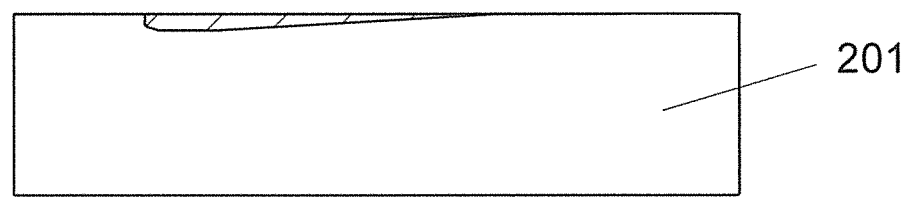

CUTTING INSERT, CUTTING TOOL AND METHOD FOR MANUFACTURING MACHINED PRODUCT

CROSS-REFERENCE TO RELATED APPLICATIONS

This application is a national stage entry according to 35 U.S.C. 371 of PCT Application No. PCT/JP2018/027525 filed on Jul. 23, 2018, which claims priority to Japanese Application No. 2017-144513 filed on Jul. 26, 2017, which is entirely incorporated herein by reference.

TECHNICAL FIELD

The present disclosure generally relates to a cutting insert, a cutting tool and a method for manufacturing a machined product, each for use in a cutting process of a workpiece. More specifically, the present disclosure relates to cutting tools for use in a milling process.

BACKGROUND

As a cutting insert used in a cutting process of a workpiece such as metal, for example, a cutting insert is discussed in WO 2010/114094 (Patent Document 1). The cutting insert discussed in Patent Document 1 may include a corner cutting edge, a main cutting edge, and a sub cutting edge, each formed on an intersecting part of an end surface and a circumferential side surface. The corner cutting edge may serve as a bottom cutting edge, the main cutting edge may serve as an outer peripheral cutting edge, and the sub cutting edge may serve as an inner peripheral cutting edge. If the cutting insert discussed in Patent Document 1 is viewed from the front, the corner cutting edge (bottom cutting edge) may have a convex curvilinear shape, and the main cutting edge (outer peripheral cutting edge) and the sub cutting edge (inner peripheral cutting edge) may have a straight line shape. The sub cutting edge discussed in Patent Document 1 may be usable, for example, in a slant milling process.

SUMMARY

A cutting insert in a non-limiting embodiment may include a first surface having a polygonal shape, a second surface connecting to the first surface, and a cutting edge located on at least a part of a ridge line where the first surface intersects with the second surface. The first surface may include a first corner, a second corner adjacent to the first corner, a third corner adjacent to the first corner on a side opposite to the second corner, a first side located between the first corner and the second corner, and a second side located between the first corner and the third corner. In a plan view of the first surface, the first side may have a straight line shape or a convex shape protruded outward relative to a first imaginary line connecting the first corner and the second corner, and the second side may have a concave shape recessed inward relative to a second imaginary line connecting the first corner and the third corner.

BRIEF DESCRIPTION OF THE DRAWINGS

FIG. 12 is a schematic diagram illustrating one of the steps in the method for manufacturing a machined product in a non-limiting embodiment.

DETAILED DESCRIPTION

Figure 1:
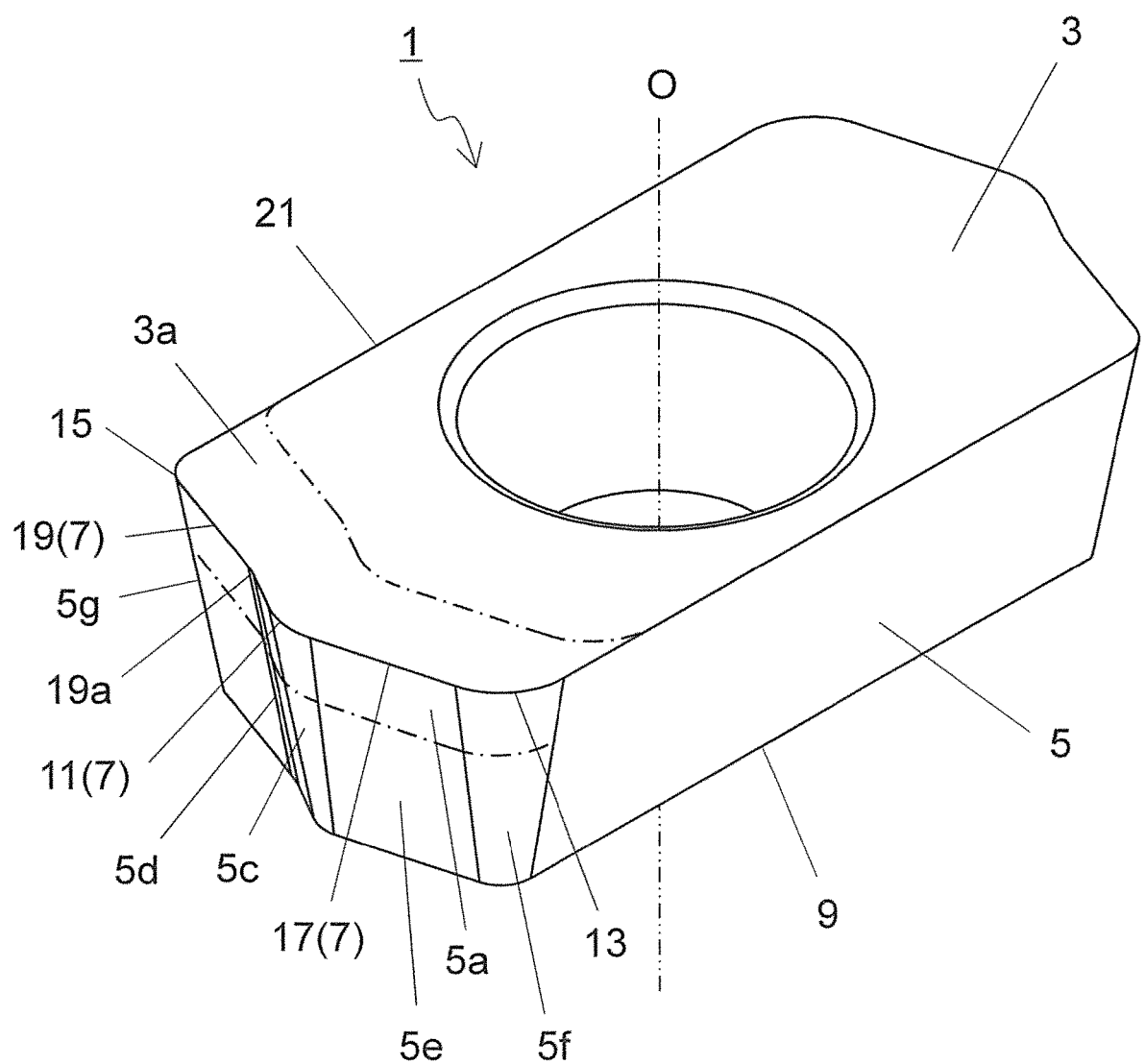
FIG. 1 is a perspective view illustrating a cutting insert in a non-limiting embodiment.

Cutting inserts 1 in non-limiting embodiments are described in detail below with reference to the drawings. For convenience of description, the drawings referred to in the following illustrate, in simplified form, only main members necessary for describing the non-limiting embodiments. The cutting inserts may be therefore capable of including any arbitrary component not illustrated in the drawings referred to in the present description. Dimensions of the members in each of the drawings may be ones which faithfully represent neither dimensions of actual structural members nor dimension ratios of these members.

<Cutting Inserts>

The cutting insert 1 (hereinafter also referred to simply as "the insert 1") in a non-limiting embodiment may include a first surface 3, a second surface 5 and a cutting edge 7. The first surface 3 may have a polygonal shape and may be an upper surface as illustrated in FIG. 1. The second surface 5 may be located adjacent to the first surface 3 and may be a side surface as illustrated in FIG. 1. The cutting edge 7 may be located on at least a ridge line where the first surface 3 intersects with the second surface 5. In other words, the cutting edge 7 may be located on at least a part of an outer peripheral edge of the first surface 3.

The insert 1 may further include a third surface 9 (a lower surface in FIG. 1) located on an opposite side of the first surface 3 as in the non-limiting embodiment illustrated in FIG. 1. The second surface 5 may be located between the first surface 3 and the third surface 9, and may connect to the first surface 3 and the third surface 9 in the non-limiting embodiment illustrated in FIG. 1.

The insert 1 may have a hexagonal plate shape and the first surface 3 and the third surface 9 individually may have a hexagonal shape in the non-limiting embodiment illustrated in FIG. 1. The shape of the insert 1 is not limited to the above configuration. There is no problem if, for example, the first surface 3 has a quadrangular, pentagonal or octagonal shape instead of the hexagonal shape.

Figure 2:
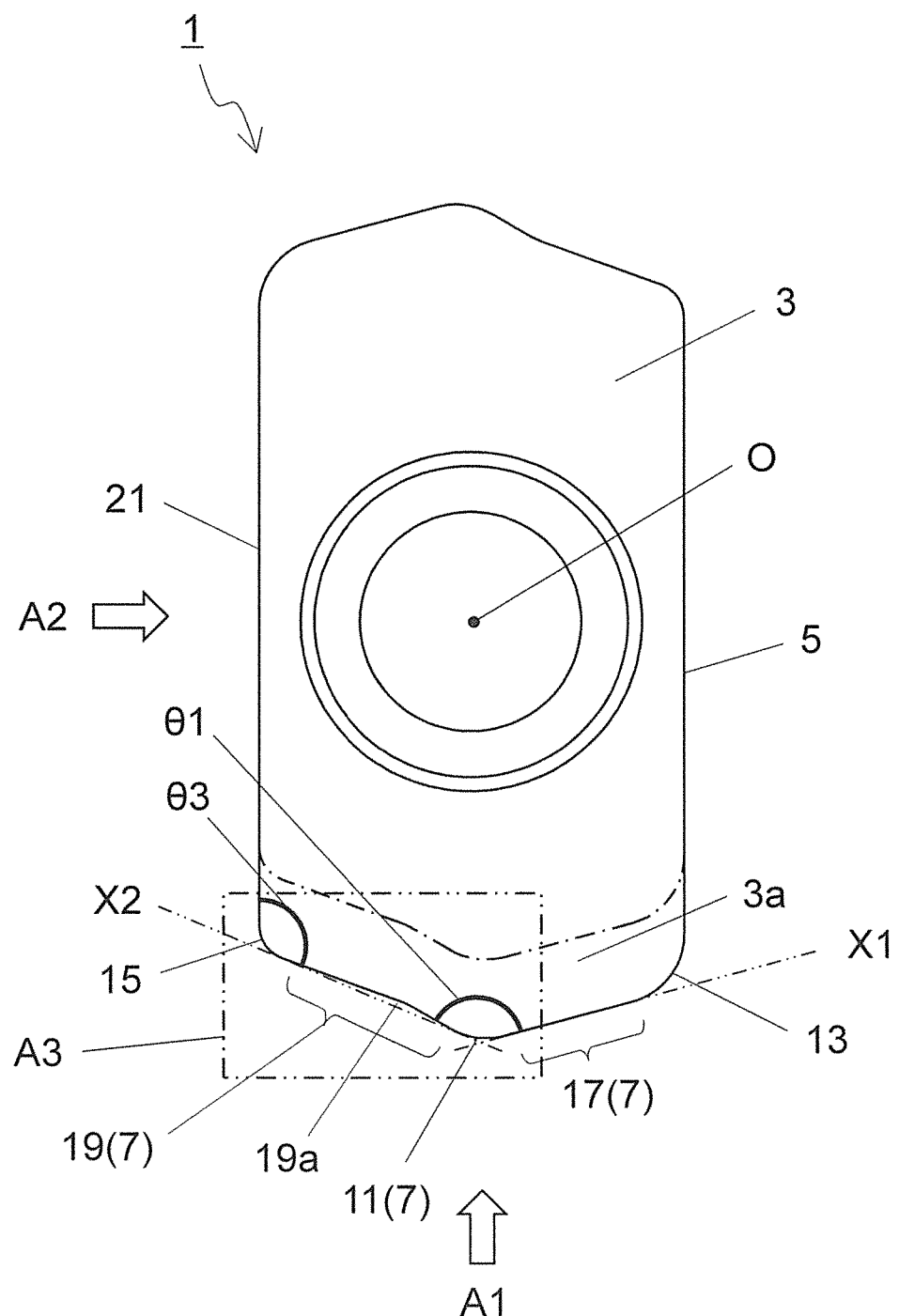
FIG. 2 is a plan view of the cutting insert illustrated in FIG. 1 as viewed from a side of a first surface.

The first surface 3 may be made in a shape having rotational symmetry of 180° on the basis of a center of the first surface 3 as in the non-limiting embodiment illustrated in FIG. 2. The center of the first surface 3 can be determined by an intersection of diagonal lines of the first surface 3.

The first surface 3 may have an approximately polygonal shape and needs not have a strict polygonal shape. Specifically, sides of the first surface 3 having the polygonal shape need not have a strict straight line shape. Corners of the first surface 3 having the polygonal shape are not limited to a structure formed by intersection of two straight lines, but may be, for example, an outwardly rounded shape. In other words, the corners of the first surface 3 may have a convex curvilinear shape in a plan view of the first surface 3.

The term "plan view of the first surface 3" may denote that the first surface 3 is viewed from a direction orthogonal to the first surface 3 if the first surface 3 has a flat surface shape, and that the first surface 3 is viewed from a direction along a central axis of the insert 1 if the first surface 3 is not a flat surface shape. The term "central axis of the insert 1" may denote an imaginary straight line passing through the center of the first surface 3 and a center of the third surface 9.

Figure 3:
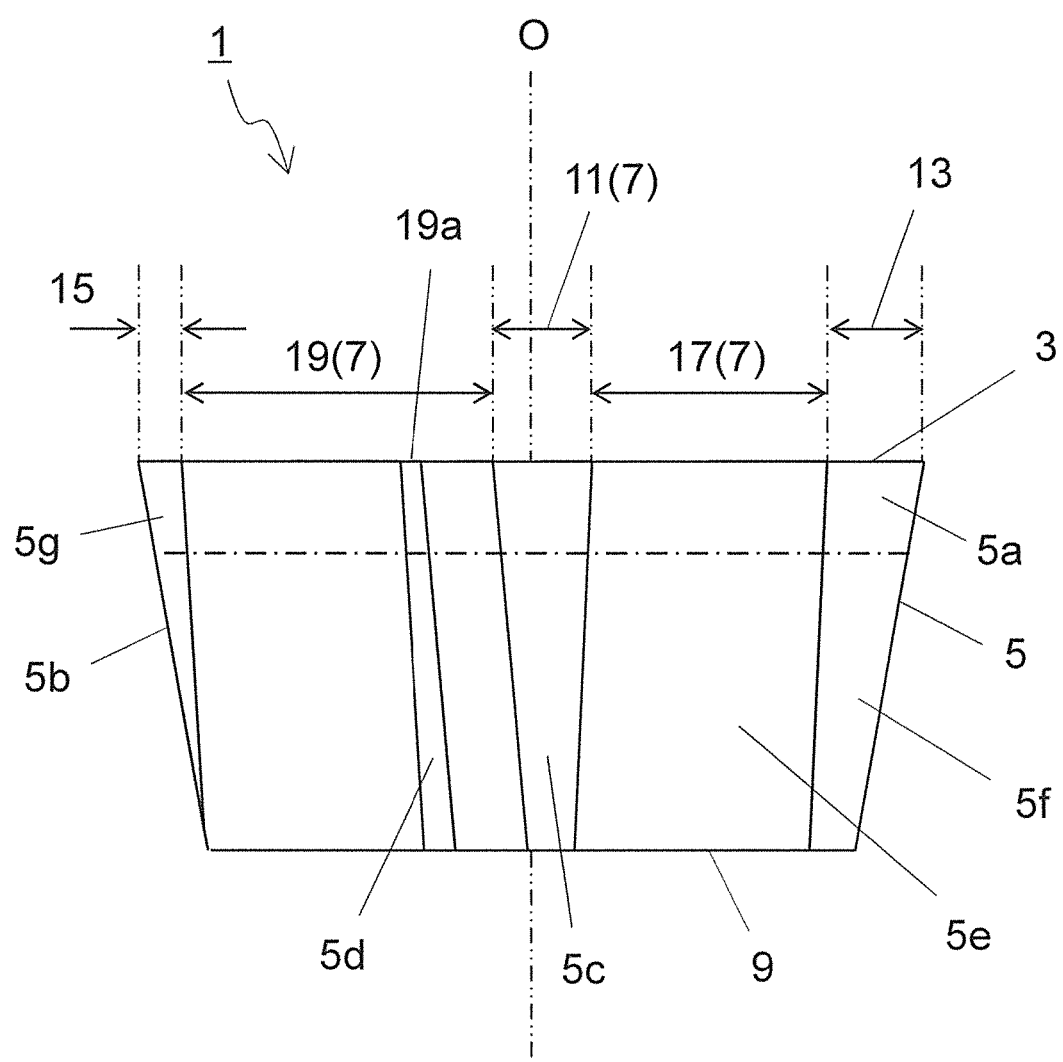
FIG. 3 is a side view of the cutting insert illustrated in FIG. 2 as viewed from direction A1.
Figure 4:
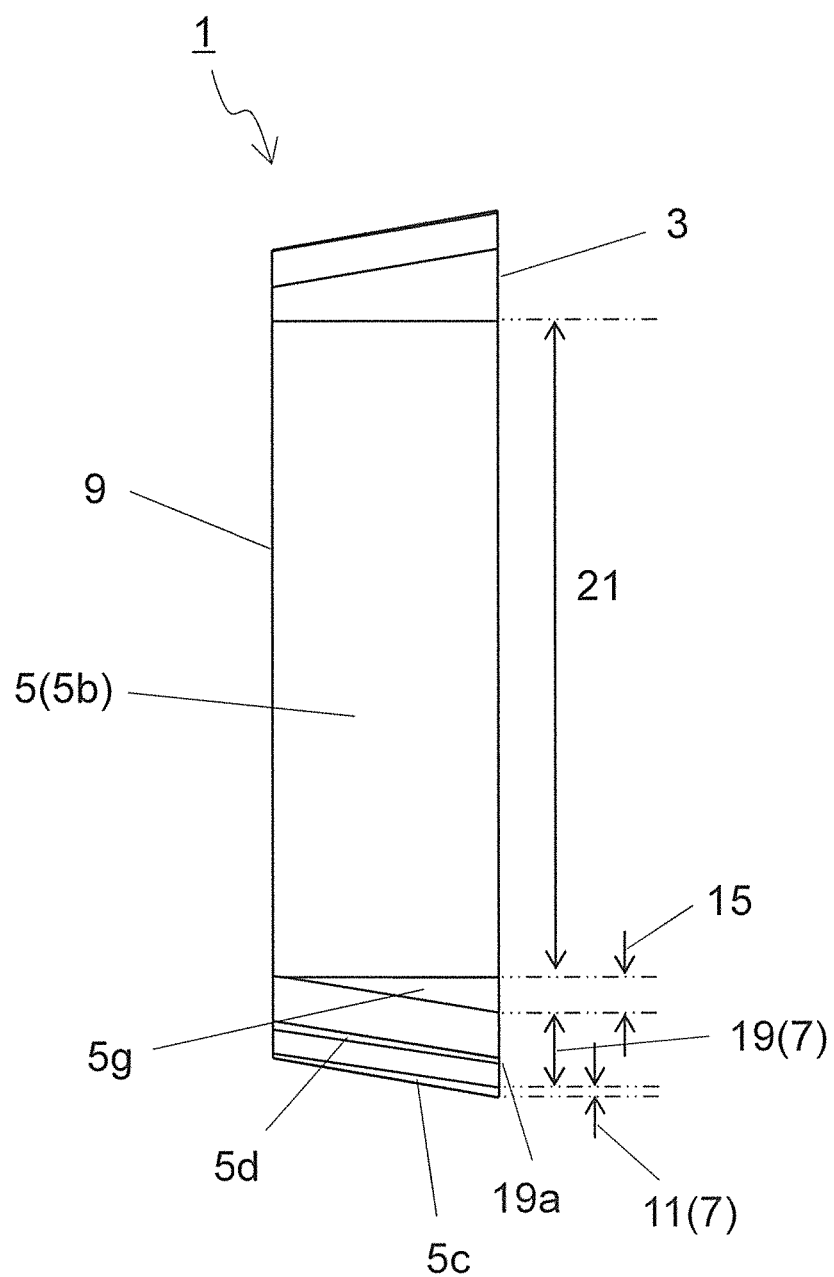
FIG. 4 is a side view of the cutting insert illustrated in FIG. 2 as viewed from direction A2.

The third surface 9 may have the same shape as the first surface 3. Similarly to the first surface 3, the third surface 9 may have a hexagonal shape in the non-limiting embodiment illustrated in FIG. 1. In this case, the third surface 9 may have a shape slightly smaller than the first surface 3. If the third surface 9 includes the above configuration, the second surface 5 may be inclined so as to approach the central axis of the insert 1 as going from an end portion on a side that connects to the first surface 3 toward an end portion on a side that connects to the third surface 9 as illustrated in FIGS. 3 and 4. If the second surface 5 is inclined as described above, the insert 1 has a so-called positive shape.

The insert 1 is, however, not limited to the positive shape, but may have a so-called negative shape. That is, the second surface 5 may be parallel to the central axis of the insert 1.

The first surface 3 may at least partially include a rake surface region 3a. For example, a region in the first surface 3 which is located along the cutting edge 7 may correspond to the rake surface region 3a. In other words, a region extended with a predetermined width from an outer peripheral edge of the first surface 3 where the cutting edge 7 is located, toward the inside of the first surface 3 may correspond to the rake surface region 3a.

The second surface 5 may at least partially include a flank surface region 5a. For example, a region in the second surface 5 which is located along the cutting edge 7 may correspond to the flank surface region 5a. In the case where the rake surface region 3a and the flank surface region 5a are respectively located in the above regions, this case may be reworded that the cutting edge 7 is located on an intersecting part of the rake surface region 3a and the flank surface region 5a.

The term "rake surface region 3a" may denote a region which is brought into contact with chips generated by the cutting edge 7 during a cutting process so as to control a chip flow direction. The term "flank surface region 5a" may denote a region which is adjacent to the rake surface region 3a by interposing the cutting edge 7 therebetween, and which is located opposed to the workpiece so as not to come into contact with the workpiece during the cutting process. The flank surface region 5a is not necessarily one which has no contact with the workpiece.

A boundary between the rake surface region 3a and other regions in the first surface 3 may be indicated by chain line, and a boundary between the flank surface region 5a and other regions in the second surface 5 may be also indicated by chain line in FIG. 1 or the like.

Dimensions of the insert 1 are not particularly limited. For example, a maximum width of the first surface 3 may be set to approximately 3-20 mm, and a height from the first surface 3 to the third surface 9 may be set to approximately 5-20 mm.

The first surface 3 may include a first corner 11, a second corner 13, a third corner 15, a first side 17 and a second side 19 as illustrated in FIG. 2. The second corner 13 may be adjacent to the first corner 11. The third corner 15 may be adjacent to the first corner 11 on a side opposite to the second corner 13.

The first side 17 may be located between the first corner 11 and the second corner 13. The second side 19 may be located between the first corner 11 and the third corner 15. These may be located side by side in order of the third corner 15, the second side 19, the first corner 11, the first side 17 and the second corner 13 on an outer peripheral edge of the first surface 3 in the non-limiting embodiment illustrated in FIG. 2. The cutting edge 7 may be located on at least the first corner 11, a part of the first side 17 and a part of the second side 19 in the non-limiting embodiment illustrated in FIG. 2.

Alternatively, a part of the cutting edge 7 which is located on the first corner 11 may be used as a bottom cutting edge. A part of the cutting edge 7 which is located on the first side 17 may be used as an outer peripheral cutting edge. A part of the cutting edge 7 which is located on the second side 19 may be used as an inner peripheral cutting edge.

The first corner 11, the second corner 13 and the third corner 15 may be parts individually located at corners of the first surface 3 having the polygonal shape. As described earlier, the corners of the first surface 3 may have the rounded shape. The first corner, the second corner 13 and the third corner 15 individually may have a curvilinear shape protruded outward in the non-limiting embodiment illustrated in FIG. 5. The first corner 11, the second corner 13 and the third corner 15 may individually have, for example, a circular arc shape.

The first side 17 may have a straight line shape or a convex shape, and the second side 19 may have a concave shape in the plan view of the first surface 3 in the non-limiting embodiments. Specifically, the first side 17 may have a straight line shape located on a first imaginary line X1 connecting the first corner 11 and the second corner 13, or the convex shape protruded outward relative to the first imaginary line X1. For example, the first side 17 may have the straight line shape located on the first imaginary line X1 in the non-limiting embodiment illustrated in FIG. 2.

The second side 19 may have the concave shape recessed inward relative to a second imaginary line X2 connecting the first corner 11 and the third corner 15. A part of the second side 19 having the concave shape which is located farthest from the second imaginary line X2 may correspond to a bottom part 19a of the second side 19.

In cases where the part of the cutting edge 7 which is located on the first side 17 is used as an outer peripheral cutting edge, if the first side 17 has the straight line shape or the convex shape as described above, the cutting edge 7 may have enhanced durability as a whole because the outer peripheral cutting edge may have enhanced durability.

In cases where the part of the cutting edge 7 which is located on the second side 19 is used as an inner peripheral cutting edge, chips generated on the inner peripheral cutting edge, for example, during a slant milling process may tend to become thinner than chips generated on the outer peripheral cutting edge. In order to stably handle the chips, a cutting edge angle of the inner peripheral cutting edge may be preferably increased in a non-limiting embodiment.

However, if the cutting edge angle of the inner peripheral cutting edge is increased, a constraining surface in the second surface 5 of the insert 1 with respect to a holder may tend to become small. In cases where the part of the cutting edge 7 which is located on the second side 19 is used as an inner peripheral cutting edge, if the second side 19 has the concave shape as described above, a cutting edge angle of the inner peripheral cutting edge may be large. It is therefore possible to stably handle the chips. Additionally, because the second side 19 may have the concave shape as described above, it may be easy to ensure a large area of a surface region 5b in the second surface 5. The insert 1 therefore may tend to be easily constrained by the holder.

If a side of the first surface 3 which is adjacent to the second side 19 with the third corner 15 interposed therebetween is referred to as a third side 21, the surface region 5b may be a part of the second surface 5 which connects to the third side 21. The surface region 5b may have a flat shape as illustrated in FIG. 4. If the surface region 5b has the flat shape, the insert 1 may tend to be more stably constrained by the holder.

If the first corner 11 and the second corner 13 have a convex curvilinear shape in the plan view of the first surface 3, an imaginary line connecting an end portion of the first corner 11 which is located on a side of the first side 17 and an end portion of the second corner 13 which is located on a side of the first side 17 may be regarded as the first imaginary line X1. If the first corner 11 and the third corner 15 have a convex curvilinear shape, an imaginary line connecting an end portion of the first corner 11 which is located on a side of the second side 19 and an end portion of the second corner 13 which is located on a side of the second side 19 may be regarded as the second imaginary line X2.

The first side 17 may have the straight line shape or the convex shape as described above. In cases where the first side 17 has the convex shape, for example, the first side 17 may have a shape including a plurality of straight line portions, or the first side 17 may have a convex curvilinear shape.

The second side 19 may include the bottom portion 19a as described above. The second side 19 may include the curvilinear part 19b having the concave curvilinear shape located and including the bottom part 19a. That is, the second side 19 may include the curvilinear part 19b, and the curvilinear part 19b may include the bottom part 19a. If the second side 19 includes the curvilinear part 19b, the bottom part 19a susceptible to cutting load concentration may have enhanced durability, and a crack may be less likely to occur in the bottom part 19a.

An imaginary line connecting the curvilinear part 19b in the second surface 19 and the first corner 11 may be referred to as a third imaginary line X3, and an imaginary line connecting the curvilinear part 19b and the third corner 15 may be referred to as a fourth imaginary line X4. If an angle θ4 formed by the third imaginary line X3 and the fourth imaginary line X4 is larger than a third corner angle θ3 of the third corner 15, the cutting edge 7 may have enhanced durability.

This is because a load applied to the bottom part 19a may be small if the bottom part 19a of the second side 19 is used as the cutting edge 7. If the third corner angle θ3 of the third corner 15 is relatively small, it may be easy to ensure a large area of the surface region 5b. The insert 1 consequently may tend to be stably constrained by the holder.

A load applied to the bottom part 19a of the second side 19 may be also small if the angle θ4 is larger than the first corner angle θ1 of the first corner 11 in the plan view of the first surface 3.

The first corner angle θ1 may be larger than the third corner angle θ3 in a front view of the insert 1. A bottom cutting edge may have enhanced durability if the part of the cutting edge 7 which is located on the first corner 11 is used as the bottom cutting edge.

Figure 5:
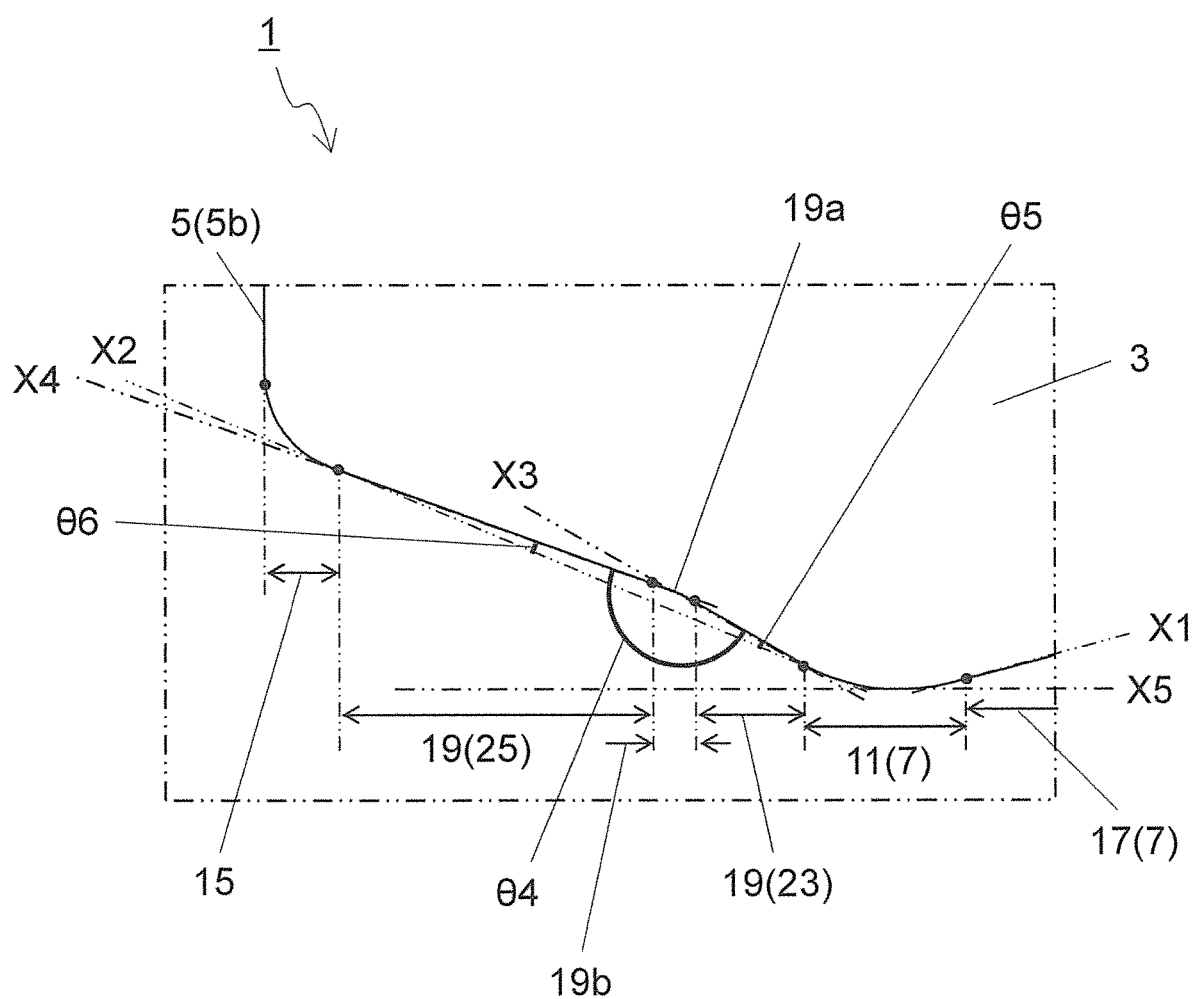
FIG. 5 is an enlarged view of a region A3 illustrated in FIG. 2.

In cases where the first corner 11 has the convex curvilinear shape and the second side 19 includes the curvilinear part 19b, a radius of curvature of the curvilinear part 19b may be larger than a radius of curvature of the first corner 11 as in the non-limiting embodiment illustrated in FIG. 5. If the first corner 11 and the curvilinear part 19b have the above configuration, the bottom part 19a susceptible to the cutting load concentration may have enhanced durability, and a crack may be less likely to occur in the bottom part 19a.

Also, in cases where the first corner 11 has the convex curvilinear shape and the second side 19 includes the curvilinear part 19b, the second surface 5 may include a first corner region 5c having a convex curved surface shape and a curved surface region 5d having a concave curved surface shape as in the non-limiting embodiment illustrated in FIG. 1. The first corner region 5c may be a region in the second surface 5 which connects to the first corner 11. The curved surface region 5d may be a region in the second surface 5 which connects to the curvilinear part 19b.

A width of the first corner region 5c may decrease as going away from the first surface 3. In other words, the width of the first corner region 5c may decrease as approaching the third surface 9. In cases where the first corner region 5c is configured as described above, the second surface 5 may be less likely to come into contact with a machined surface of a workpiece if a part of the cutting edge 7 which is located on the first corner 11 is used as the bottom cutting edge. This may lead to improved surface accuracy of the machined surface.

Alternatively, a width of the curved surface region 5d may increase as going away from the first surface 3. In other words, the width of the curved surface region 5d may decrease as approaching the third surface 9. If the curved surface region 5d is configured as described above, a cutting load transmitted from the bottom part 19a susceptible to the cutting load concentration to the curved surface 5d may tend to disperse in a wide range. This may lead to enhanced durability of the insert 1.

The term "width" may denote a length of the insert 1 in a direction orthogonal to a central axis thereof (for example, a crosswise direction in FIG. 3).

The second side 19 may have a concave shape in the plan view of the first surface 3. The second side 19 is not limited to a particular shape. The second side 19 may include a first straight line part 23 extended from the curvilinear part 19b toward the first corner 11, and a second straight line part 25 extended from the curvilinear part 19b toward the third corner 15 as in the non-limiting embodiment illustrated in FIG. 5. The first straight line part 23 may be located on the third imaginary line X3 in the non-limiting embodiment illustrated in FIG. 5. The straight line part 25 may be located on the fourth imaginary line X4 in the non-limiting embodiment illustrated in FIG. 5. The first straight line part 23 may be located on the third imaginary line X3 in the non-limiting embodiment illustrated in FIG. 5. The second straight line part 25 may be located on the fourth imaginary line X4 in the non-limiting embodiment illustrated in FIG. 5. In cases where the second side 19 includes the first straight line part 23, if a part of the cutting edge 7 which is located on the second side 19 is used as an inner peripheral cutting edge, it may be easy to ensure a large thickness of chips generated by the inner peripheral cutting edge. This makes it possible to more stably treat the chips. If the second side 19 includes the second straight line part 25, it may be easy to ensure a large area of the surface region 5b. The insert 1 therefore may tend to be stably constrained by the holder.

In cases where the second side 19 includes the first straight line part 23 and the second straight line part 25, the second straight line part 25 may be longer than the first straight line part 23 in the plan view of the first surface 3 as in the non-limiting embodiment illustrated in FIG. 5. If the second side 19 has the above configuration, it may be easy to ensure a larger area of the surface region 5b in the second surface 5 while increasing the cutting edge angle of the inner peripheral cutting edge.

An angle θ5 formed by the second imaginary line X2 and the first straight line part 23 may be larger than an angle θ6 formed by the second imaginary line X2 and the second straight line part 25 in the plan view of the first surface 3. In other words, the angle θ5 formed by the second imaginary line X2 and the third imaginary line X3 may be larger than the angle θ6 formed by the second imaginary line X2 and the fourth imaginary line X4 in the plan view of the first surface 3. If the angle θ5 is larger than the angle θ6, it may be easy to ensure a large cutting edge angle of the inner peripheral cutting edge.

Figure 6:
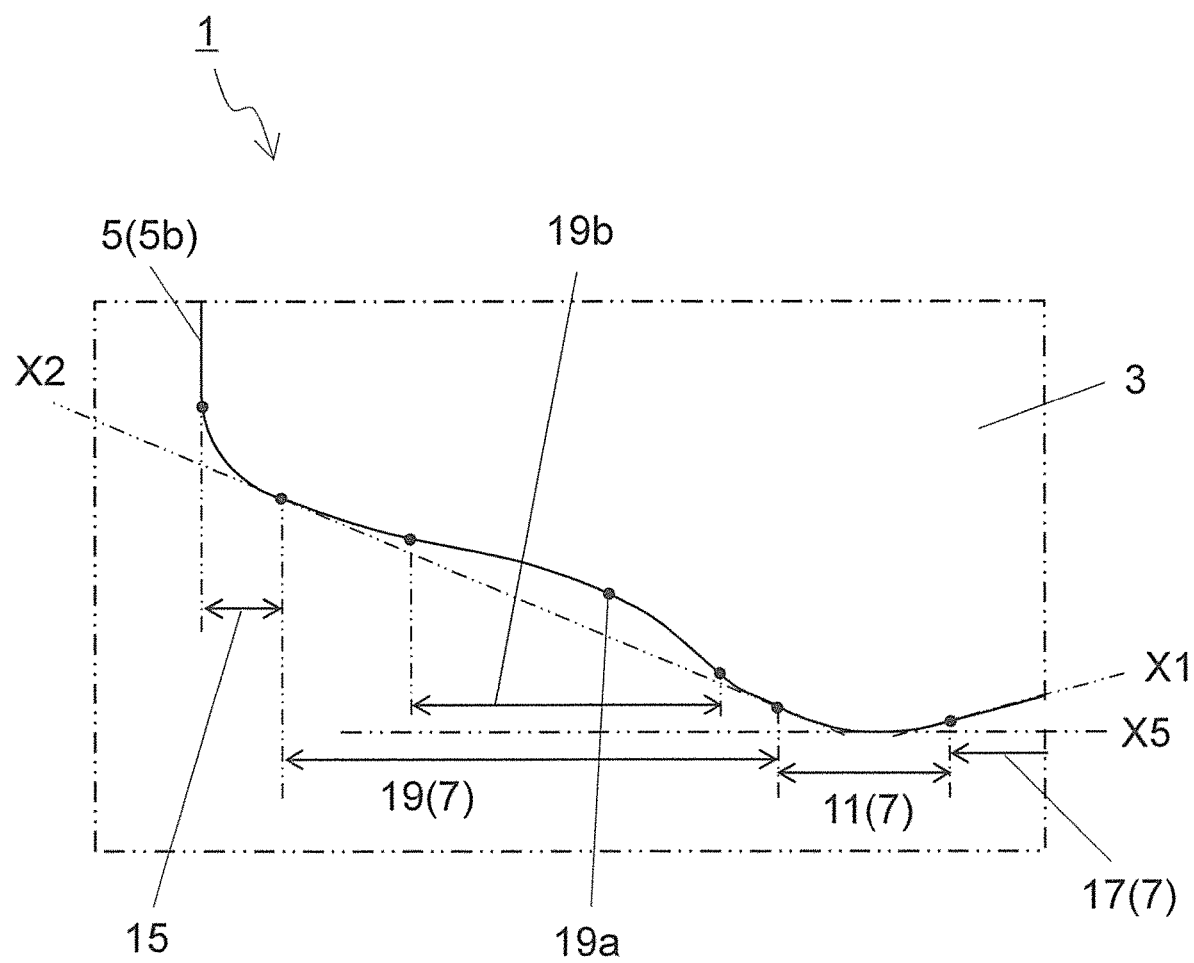
FIG. 6 is an enlarged view of another non-limiting embodiment of the cutting insert illustrated in FIG. 5.

The second side 19 is not limited to the above shape. The second side 19 may have, for example, a concave curvilinear shape in the plan view of the first surface 3 as illustrated in FIG. 6.

An imaginary line that is orthogonal to a bisector of the first corner 11 and is in contact with the first corner 11 may be referred to as a fifth imaginary line X5. The second side 19 may go away from the fifth imaginary line X5 as going away from the first corner 11 in the non-limiting embodiment illustrated in FIG. 5. Because the second side 19 may have the concave shape in the non-limiting embodiments, a part of the second side 19 which is located close to the third corner 15 may tend to have a small inclination angle relative to the fifth imaginary line X5.

If the second side 19 is located away from the fifth imaginary line X5 as going away from the first corner 11, chips generated on the second side 19 may tend to flow in a direction away from the third side 21. The chips may be therefore less likely to come into contact with the holder, and hence chip clogging may be less likely to occur.

In cases where the first corner 11 has the convex curvilinear shape and the first side 17 has the straight line shape, the second surface 5 may include a first corner region 5c having a convex curved surface shape and a flat region 5e having a flat surface shape as in the non-limiting embodiment illustrated in FIG. 1. The flat surface region 5e may be a region of the second surface 5 which connects to the first side 17.

In this case, a width of the flat surface region 5e may be constant. In other words, a width of a portion of the flat surface region 5e which is located on a side of the first surface 3 may be identical with a width of a portion of the flat surface region 5e which is located on a side of the third surface 9.

If a part of the cutting edge 7 which is located on the first side 17 is used as an outer peripheral cutting edge, the part may be susceptible to a relatively large cutting load. If the flat surface region 5e is configured as described above, the flat surface region 5e that connects to the first side 17 may have enhanced durability, thus leading to enhanced durability of the insert 1.

The second surface 5 may include a second corner region 5f having a convex curved surface shape and a third corner region 5g having a convex curved surface shape. The second corner region 5f may be a region of the second surface 5 which connects to the second corner 13. The third corner region 5g may be a region of the second surface 5 which connects to the third corner 15.

Alternatively, the first corner region 5c and the second corner region 5f may connect to the third surface 9. In this case, if a cutting load is applied to the first corner region 5c and the second corner region 5f, the cutting load may tend to be stably received by the holder. The insert 1 therefore may tend to be held stably by the holder. Still alternatively, the third corner region 5g may be located away from the third surface 9. In this case, it may be easy to ensure a large area of the surface region 5b. The insert 1 therefore may tend to be stably constrained by the holder.

In cases where the second side 19 includes the bottom part 19a, the bottom part 19a may be located closer to the first corner 11 than the bottom part 19a is to the third corner 15. If the bottom part 19a is located as described above, it may be easy to ensure a large cutting edge angle of the inner peripheral cutting edge.

The insert 1 may include a through hole 27 that opens into the first surface 3 in the non-limiting embodiments. The through hole 27 illustrated in FIG. 1 may be formed from a center of the first surface 3 toward a center of the third surface 9. The through hole 27 may be used for fixing the insert 1 to a holder of a cutting tool. The insert 1 is fixable to the holder, for example, by inserting a screw into the through hole 27, and by screwing the insert 1.

An extending direction, namely, a penetrating direction of the through hole 27 may be orthogonal to the first surface 3 and the third surface 9 in the non-limiting embodiments. Because the through hole 27 may be formed from the center to the center of the third surface 9, a central axis O of the through hole 27 may coincide with the center of the first surface 3.

For example, cemented carbide or cermet is usable as a material of the insert 1. Examples of composition of the cemented carbide may include WC-Co, WC-TiC-Co and WC-TiC-TaC-Co. WC, TiC and TaC may be hard particles, and Co may be a binding phase.

The cermet may be a sintered composite material obtainable by compositing metal into a ceramic component. Examples of the cermet may include titanium compounds composed mainly of titanium carbide (TiC) or titanium nitride (TiN). However, it is not intended to limit the material of the insert 1 to the above composition.

A surface of the insert 1 may be coated with a coating film by using a chemical vapor deposition (CVD) method or a physical vapor deposition (PVD) method. Examples of composition of the coating film may include titanium carbide (TiC), titanium nitride (TiN), titanium carbonitride (TiCN) and alumina ($Al_2O_3$).

<Cutting Tool>

Figure 7:
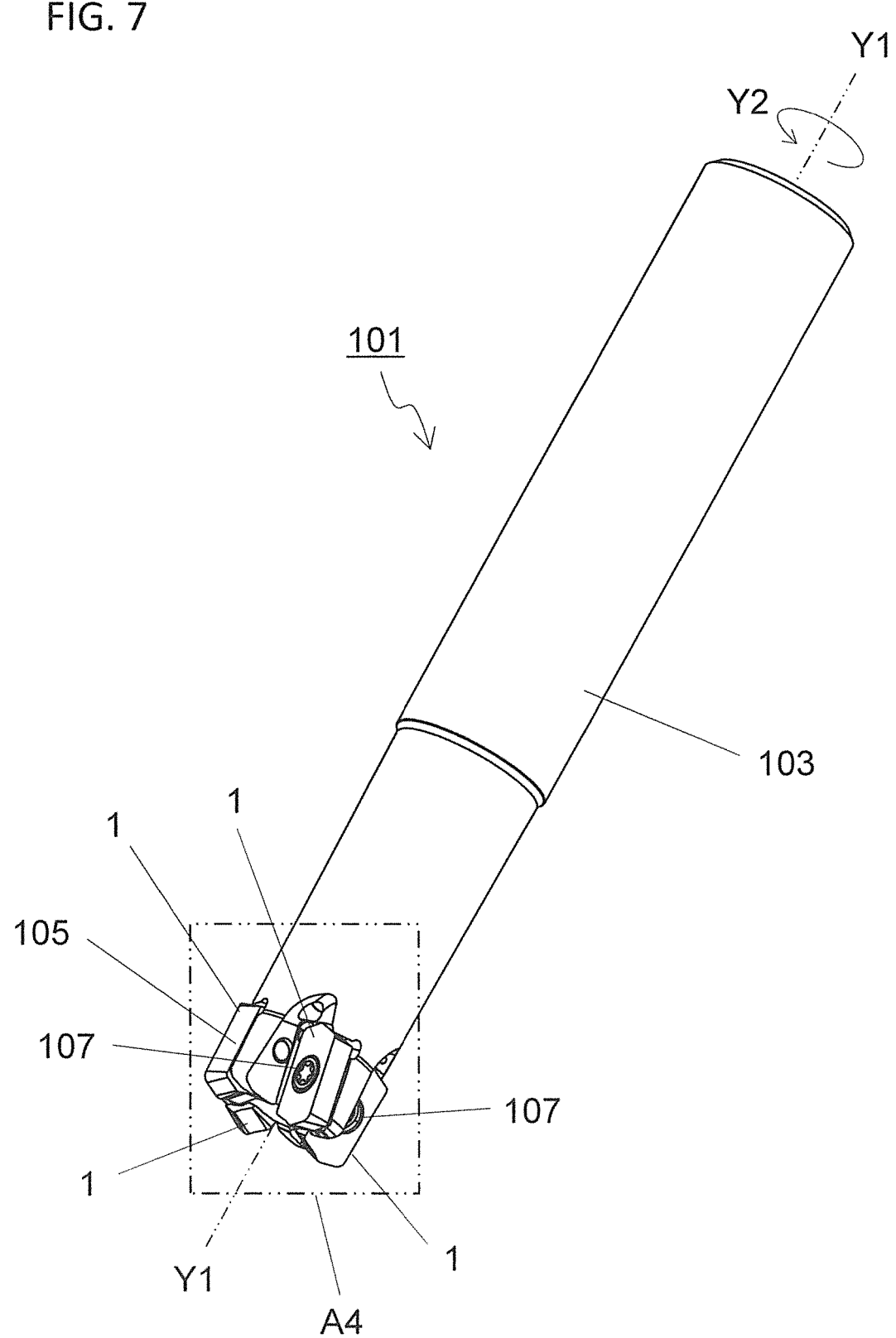
FIG. 7 is a perspective view illustrating a cutting tool in a non-limiting embodiment.
Figure 8:
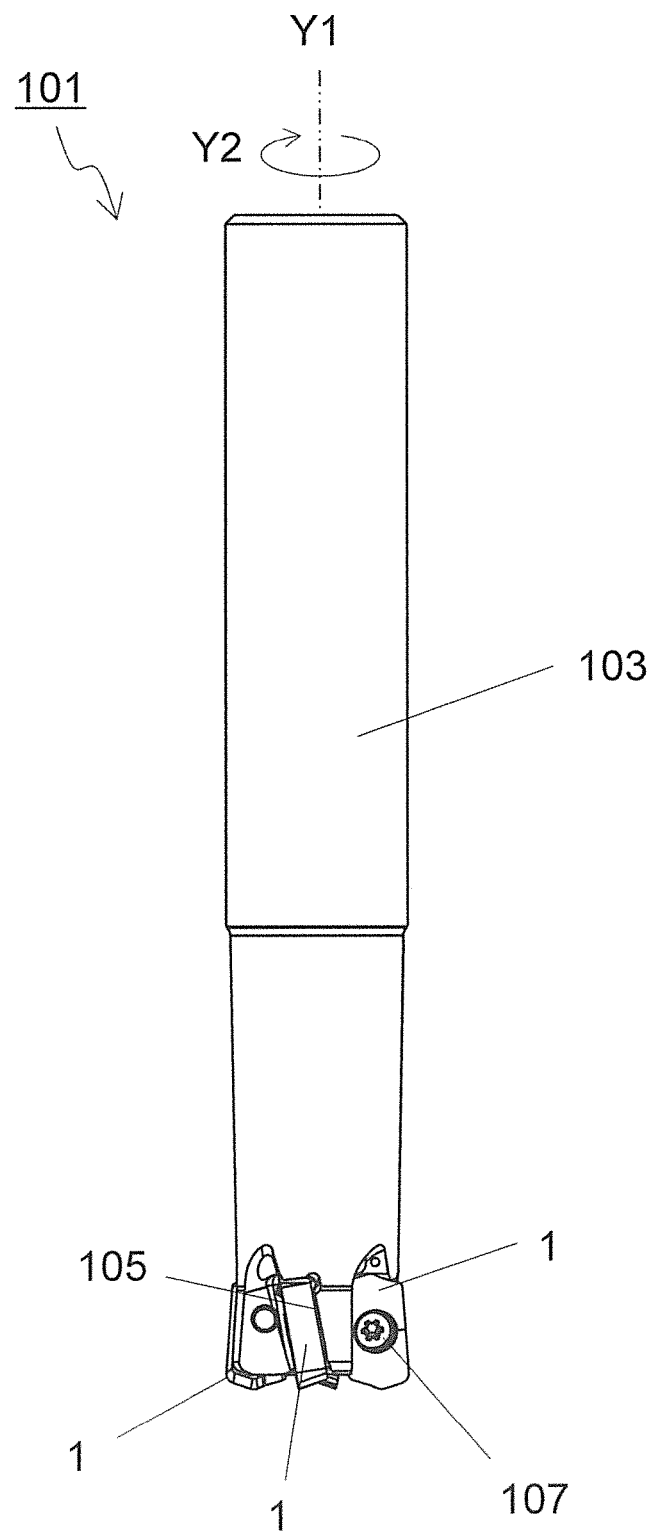
FIG. 8 is a side view of the cutting tool illustrated in FIG. 7.
Figure 9:
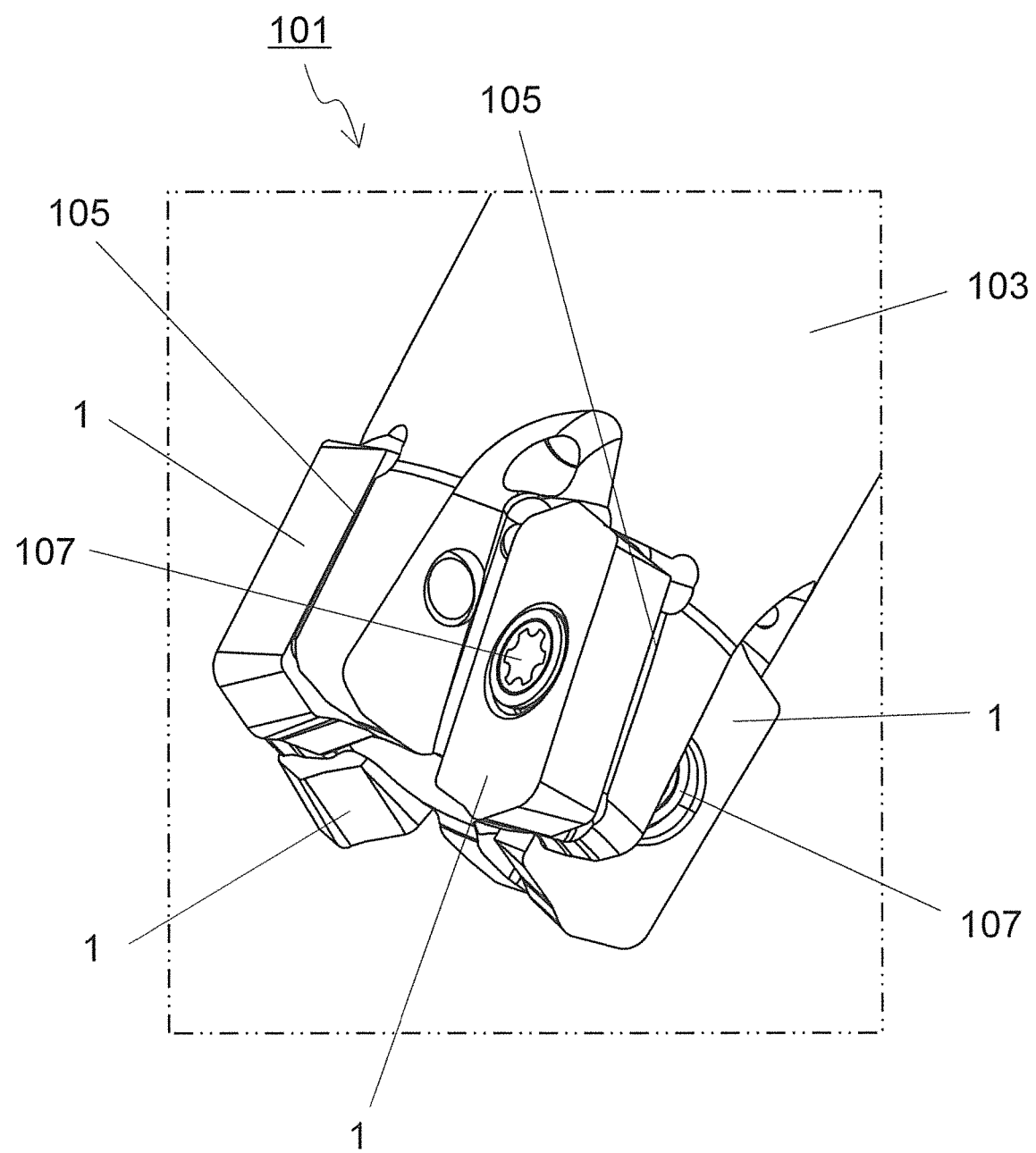
FIG. 9 is an enlarged view of a region A4 illustrated in FIG. 7.

A cutting tool 101 in a non-limiting embodiment may be described below with reference to FIGS. 7 to 9. FIGS. 7 to 9 may illustrate a state in which the insert 1 illustrated in FIG. 1 is attached to an insert pocket 105 (hereinafter also referred to simply as the pocket 105) of a holder 103 by a screw 107. A rotation axis Y1 of the cutting tool 101 may be indicated by a dash-dot-dot-dash line in FIG. 7 or the like.

The cutting tool 101 in the non-limiting embodiments is usable in a milling process. The cutting tool 101 may include the holder 103 having the rotation axis Y1, and may include a plurality of pockets 105 on an outer peripheral surface on a side of a front end of the holder 103, and the insert 1 attached to each of the pockets 105.

The holder 103 may have an approximately circular columnar shape around the rotation axis Y1. A plurality of pockets 105 may be disposed on the outer peripheral surface on the side of the front end of the holder 103. The pockets 105 may be designed to permit attachment of the insert 1, and open into the outer peripheral surface and a front end surface of the holder 103. The plurality of pockets 105 may be disposed at equal intervals or unequal intervals. The holder 103 may not be a strict circular columnar shape because the holder 103 may include the plurality of pockets 105.

The inserts 1 may be individually attached to the plurality of pockets 105 disposed in the holder 103. A plurality of inserts 1 may be attached so that at least a part of the cutting edge may be protruded from the holder 103. Specifically, the plurality of inserts 1 may be attached to the holder 103 so that the first corner, the first side and the second side may be protruded from the holder toward a workpiece in the non-limiting embodiments.

The inserts 1 may be individually attached to the pockets 105 so that the first surface may be directed to a front side in a rotation direction Y2 of the rotation axis Y1, and also so that the third surface may be directed to a rear side in the rotation direction Y2 of the rotation axis Y1 in the non-limiting embodiments. Thus, the first surface and the third surface of the inserts 1 may not be necessarily located in a vertical direction under use environment of the cutting tool 101.

The inserts 1 may be individually attached to the pockets 105 by a screw 107. Each of the inserts 1 is attachable to the holder 103 by inserting the screw 107 into the through hole of the insert 1, and by inserting a front end of the screw 107 into a screw hole formed in the pocket 105 so as to fix the screw 107 to the screw hole. For example, steel or cast iron is usable for the holder 103. Of these materials, the steel may be particularly used from the viewpoint of enhancing toughness of the holder 103.

<Method for Manufacturing Machined Product>

Figure 10:
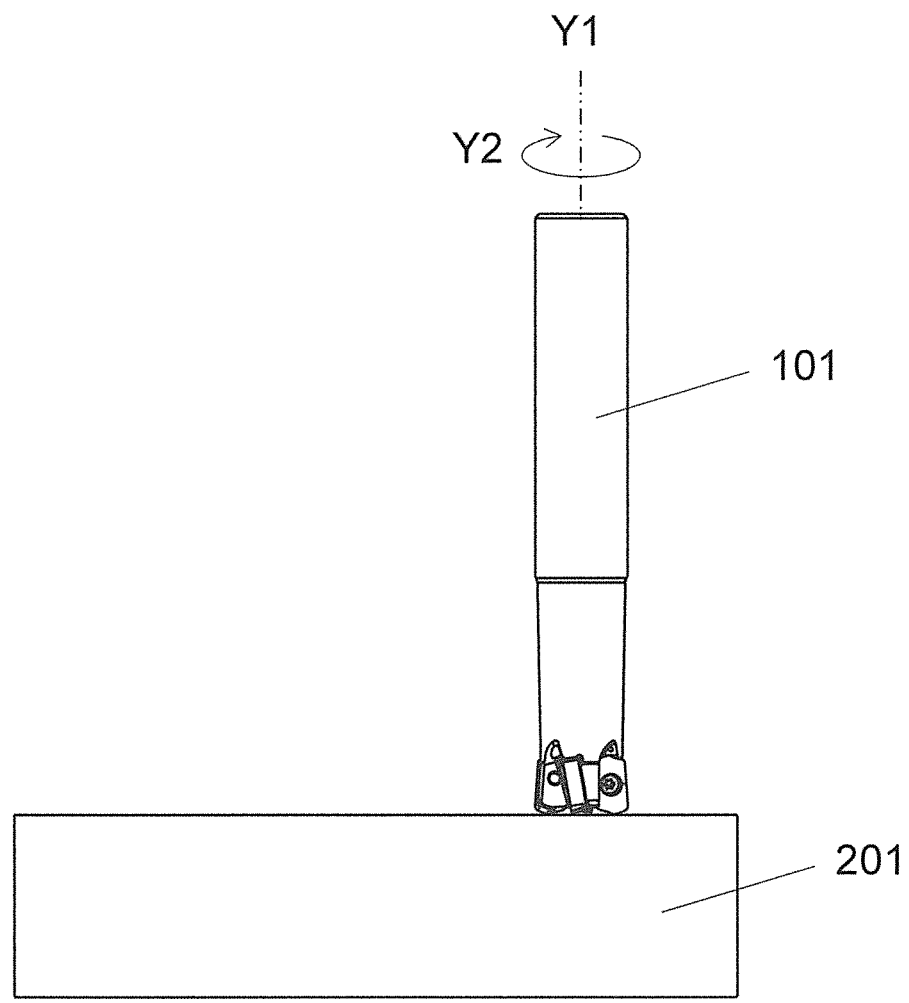
FIG. 10 is a schematic diagram illustrating one of the steps in a method for manufacturing a machined product in a non-limiting embodiment.
Figure 11:
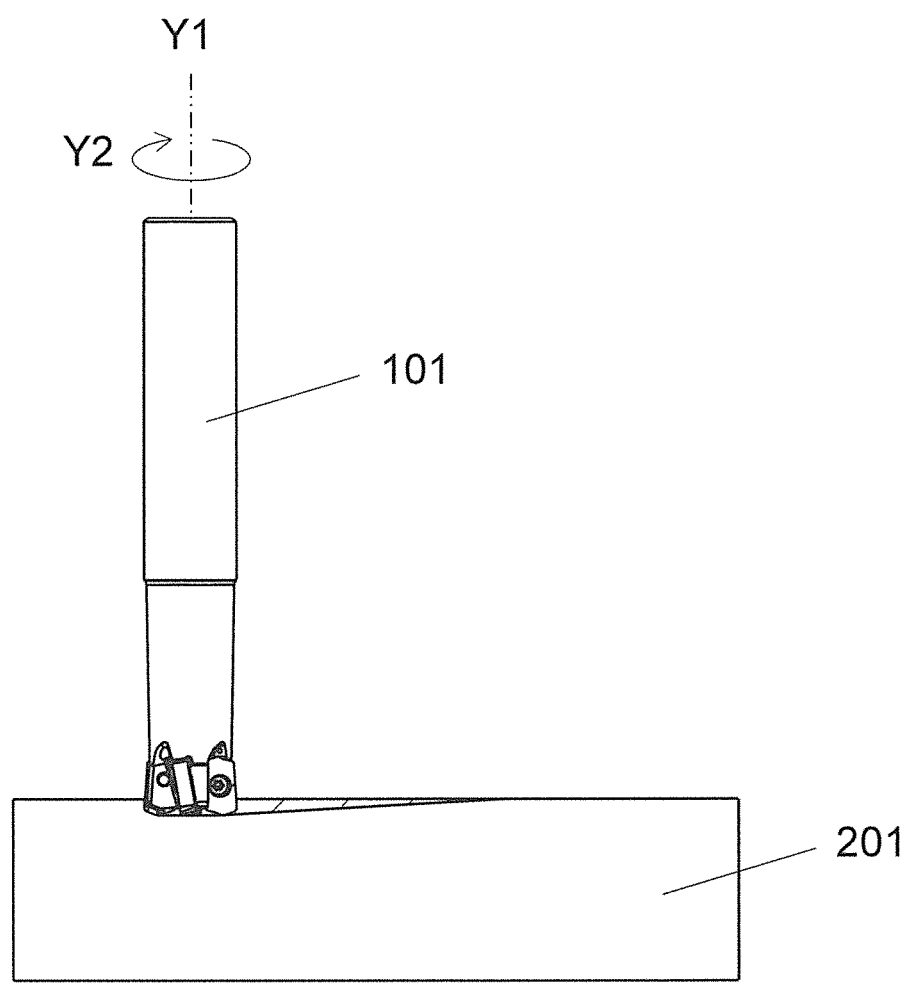
FIG. 11 is a schematic diagram illustrating one of the steps in the method for manufacturing a machined product in a non-limiting embodiment.

A method for manufacturing a machined product in a non-limiting embodiment of the present disclosure may be described below with reference to FIGS. 10 to 12. FIGS. 10 to 12 may illustrate the method for manufacturing a machined product if a cutting process is carried out using the cutting tool as described above. A rotation axis Y1 of the cutting tool 101 may be indicated by a dash-dot-dot-dash line. The machined product is manufacturable by carrying out the cutting process of a workpiece 201. The manufacturing method in the non-limiting embodiments may include the following steps:

the step (1) of rotating the cutting tool 101 represented by the foregoing non-limiting embodiments;

the step (2) of bringing a cutting edge of the cutting tool 101 being rotated into contact with the workpiece 201; and the step (3) of moving the cutting tool 101 away from the workpiece 201.

More specifically, firstly, the cutting tool 101 may be relatively brought near the workpiece 201 while rotating the cutting tool 101 in Y2 direction around the rotation axis Y1 as illustrated in FIG. 10. The workpiece 201 may be then cut out by bringing the cutting edge in the cutting tool 101 into contact with the workpiece 201 as illustrated in FIG. 11.

Thereafter, the cutting tool 101 may be relatively moved away from the workpiece 201 as illustrated in FIG. 12. A region of the workpiece 201 cut out by the cutting tool 101 may be marked with slant lines in FIGS. 11 and 12 in order to facilitate visual understanding.

The workpiece 201 may be fixed and the cutting tool 101 may be brought near the workpiece 201 in the above non-limiting embodiment. The workpiece 201 may be fixed and the cutting tool 101 may be rotated around the rotation axis Y1 in FIGS. 10 to 12. The workpiece 201 may be fixed and the cutting tool 101 may be moved away in FIG. 12. Although the workpiece 201 may be fixed and the cutting tool 101 may be moved in the individual steps in the cutting process using the manufacturing method in the above non-limiting embodiment, it may not be intended to be limited to this embodiment.

For example, the workpiece 201 may be brought near the cutting tool 101 in the step (1). Similarly, the workpiece 201 may be moved away from the cutting tool 101 in the step (3). If desired to continue the cutting process, the step of bringing the cutting edge in the insert 1 into contact with different portions of the workpiece 201 may be repeated while keeping the cutting tool 101 rotated.

Representative examples of material of the workpiece 201 may include carbon steel, alloy steel, stainless steel, cast iron and nonferrous metals.

DESCRIPTION OF THE REFERENCE NUMERALS 1 cutting insert (insert)
3 first surface
3a rake surface region
5 second surface
5a flank surface region
5b surface region
5c first corner region
5d curved surface region
5e flat surface region
5f second corner region
5g third corner region
7 cutting edge
9 third surface
11 first corner
13 second corner
15 third corner
17 first side
19 second side
19a bottom part
19b curvilinear part
21 third side
23 first straight line part
25 second straight line part
27 through hole
101 cutting tool
103 holder
105 insert pocket (pocket)
107 screw
201 workpiece
θ1 first corner angle
θ3 third corner angle
θ4 angle formed by third imaginary line X3 and fourth imaginary line X4
θ5 angle formed by second imaginary line X2 and first straight line part 23 θ6 angle formed by second imaginary line X2 and fourth imaginary line X4
X1 first imaginary line X2 second imaginary line
X3 third imaginary line
X4 fourth imaginary line
X5 fifth imaginary line
Y1 rotation axis
Y2 rotation direction
O central axis

The invention claimed is:
1. A cutting insert, comprising:
a first surface having a polygonal shape;
a second surface connecting to the first surface; and
a cutting edge located on at least a part of a ridge line where the first surface intersects with the second surface, wherein
the first surface comprises:
  a first corner,
  a second corner adjacent to the first corner,
  a third corner adjacent to the first corner on a side of the first corner opposite to the second corner,
  a first side located between the first corner and the second corner, and
  a second side located between the first corner and the third corner;
in a plan view of the first surface,
  the first side has a straight line shape or a convex shape protruded outward relative to a first imaginary line connecting closest points of the first corner and the second corner,
  the second side has a concave shape recessed inward relative to a second imaginary line connecting closest points of the first corner and the third corner,
  a part of the second side located farthest from the second imaginary line is a bottom part in the plan view of the first surface,
  the second side comprises a curvilinear part having a concave curvilinear shape and including the bottom part, and
  the first corner has a convex curvilinear shape and a radius of curvature of the curvilinear part is larger than a radius of curvature of the first corner in the plan view of the first surface.
2. The cutting insert according to claim 1, wherein an angle formed by a third imaginary line connecting closest points of the curvilinear part and the first corner and a fourth imaginary line connecting closest points of the curvilinear part and the third corner is larger than a corner angle of the third corner.
3. The cutting insert according to claim 2, wherein the angle formed by the third imaginary line and the fourth imaginary line is larger than a corner angle of the first corner in the plan view of the first surface.
4. The cutting insert according to claim 1, wherein the first corner has a convex curvilinear shape in the plan view of the first surface;
the second surface comprises:
  a first corner region having a convex curved surface shape and connecting to the first corner, and
  a curved surface region having a concave curved surface shape and connecting to the curvilinear part;
a width of the first corner region decreases as going away from the first surface; and
a width of the curved surface region increases as going away from the first surface.
5. The cutting insert according to claim 1, wherein the second side comprises a first straight line part extended from the curvilinear part toward the first corner, and a second straight line part extended from the curvilinear part toward the third corner in the plan view of the first surface.
6. The cutting insert according to claim 5, wherein the second straight line part is longer than the first straight line part in the plan view of the first surface.
7. The cutting insert according to claim 6, wherein an angle formed by the second imaginary line and the first straight line part is larger than an angle formed by the second imaginary line and the second straight line part in the plan view of the first surface.
8. The cutting insert according to claim 1, wherein the first corner has a convex curvilinear shape in the plan view of the first surface;
the second surface comprises:
  a first corner region having a convex curved surface shape and connecting to the first corner, and
  a flat surface region having a flat shape and connecting to the first side;
a width of the first corner region decreases as going away from the first surface; and
a width of the flat surface region is constant.
9. The cutting insert according to claim 1, further comprising:
a third surface located on an opposite side of the first surface, wherein
the first corner, the second corner, and the third corner have a convex curvilinear shape in the plan view of the first surface;
the second surface comprises:
  a first corner region having a convex curved surface shape and connecting to the first corner,
  a second corner region having a convex curved surface shape and connecting to the second corner, and
  a third corner region having a convex curved surface shape and connecting to the third corner; and
the first corner region and the second corner region connect to the third surface, and the third corner region is located away from the third surface.
10. The cutting insert according to claim 1, wherein a part of the second side which is located farthest from the second imaginary line is a bottom part in the plan view of the first surface, and the bottom part is located closer to the first corner than the bottom part is located relative to the third corner.
11. The cutting insert according to claim 1, wherein a corner angle of the first corner is larger than a corner angle of the third corner in the plan view of the first surface.
12. A cutting tool, comprising:
a holder comprising a pocket located on a side of a front end of the holder; and
the cutting insert according to claim 1, the cutting insert being located in the pocket.
13. A method for manufacturing a machined product, comprising:
rotating the cutting tool according to claim 12;
bringing the cutting tool being rotated into contact with a workpiece; and
moving the cutting tool away from the workpiece.
14. A cutting insert, comprising:
a first surface having a polygonal shape;
a second surface connecting to the first surface; and
a cutting edge located on at least a part of a ridge line where the first surface intersects with the second surface, wherein
the first surface comprises:

a first corner,
a second corner adjacent to the first corner,
a third corner adjacent to the first corner on a side of the first corner opposite to the second corner,
a first side located between the first corner and the second corner, and
a second side located between the first corner and the third corner;
in a plan view of the first surface,
the first side has a straight line shape or a convex shape protruded outward relative to a first imaginary line connecting closest points of the first corner and the second corner,
the second side has a concave shape recessed inward relative to a second imaginary line connecting closest points of the first corner and the third corner, and
the first corner has a convex curvilinear shape in the plan view of the first surface; the second surface comprises:
a first corner region having a convex curved surface shape and connecting to the first corner, and
a curved surface region having a concave curved surface shape and connecting to the curvilinear part;
a width of the first corner region decreases as going away from the first surface; and
a width of the curved surface region increases as going away from the first surface.

15. A cutting tool, comprising:
a holder comprising a pocket located on a side of a front end of the holder; and
the cutting insert according to claim 14, the cutting insert being located in the pocket.

16. A method for manufacturing a machined product, comprising:
rotating the cutting tool according to claim 15;
bringing the cutting tool being rotated into contact with a workpiece; and
moving the cutting tool away from the workpiece.

17. A cutting insert, comprising:
a first surface having a polygonal shape;
a second surface connecting to the first surface;
a third surface located on an opposite side of the first surface; and
a cutting edge located on at least a part of a ridge line where the first surface intersects with the second surface, wherein
the first surface comprises:
a first corner,
a second corner adjacent to the first corner,
a third corner adjacent to the first corner on a side of the first corner opposite to the second corner,
a first side located between the first corner and the second corner, and
a second side located between the first corner and the third corner;
in a plan view of the first surface,
the first side has a straight line shape or a convex shape protruded outward relative to a first imaginary line connecting closest points of the first corner and the second corner,
the second side has a concave shape recessed inward relative to a second imaginary line connecting closest points of the first corner and the third corner, and
wherein:
the first corner, the second corner, and the third corner have a convex curvilinear shape in the plan view of the first surface;
the second surface comprises:
a first corner region having a convex curved surface shape and connecting to the first corner,
a second corner region having a convex curved surface shape and connecting to the second corner, and
a third corner region having a convex curved surface shape and connecting to the third corner, and
the first corner region and the second corner region connect to the third surface, and the third corner region is located away from the third surface.

18. A cutting tool, comprising:
a holder comprising a pocket located on a side of a front end of the holder; and
the cutting insert according to claim 17, the cutting insert being located in the pocket.

19. A method for manufacturing a machined product, comprising:
rotating the cutting tool according to claim 18;
bringing the cutting tool being rotated into contact with a workpiece; and
moving the cutting tool away from the workpiece.

* * * * *